United States Patent
Loh et al.

(10) Patent No.: US 8,719,537 B2
(45) Date of Patent: *May 6, 2014

(54) MEMORY POWER TOKENS

(71) Applicant: Microsoft Corporation, Redmond, WA (US)

(72) Inventors: Gabriel H. Loh, Bellevue, WA (US); Douglas Burger, Seattle, WA (US); Timothy Sherwood, Santa Barbara, CA (US); Karin Strauss, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,860

(22) Filed: Aug. 7, 2013

(65) Prior Publication Data

US 2013/0326185 A1    Dec. 5, 2013

Related U.S. Application Data

(63) Continuation of application No. 12/970,890, filed on Dec. 16, 2010, now Pat. No. 8,521,981.

(51) Int. Cl.
*G06F 12/00* (2006.01)
*G06F 13/00* (2006.01)
*G06F 13/28* (2006.01)
*G06F 1/26* (2006.01)
*G06F 1/32* (2006.01)

(52) U.S. Cl.
USPC ............ 711/167; 711/104; 711/154; 713/320

(58) Field of Classification Search
USPC ........... 711/104, 154, 167–169; 713/300–340
See application file for complete search history.

(56) References Cited

U.S. PATENT DOCUMENTS

| | | | |
|---|---|---|---|
| 6,877,049 B1 * | 4/2005 | Myers | 710/56 |
| 7,159,082 B1 * | 1/2007 | Wade | 711/155 |
| 7,370,168 B2 * | 5/2008 | Kanamori et al. | 711/167 |
| 2003/0217295 A1 * | 11/2003 | Sadowski | 713/300 |
| 2006/0031644 A1 * | 2/2006 | Hughes | 711/159 |
| 2008/0253177 A1 * | 10/2008 | Hsu et al. | 365/163 |
| 2008/0263373 A1 * | 10/2008 | Meier et al. | 713/300 |
| 2011/0122691 A1 * | 5/2011 | Sprouse | 365/185.03 |
| 2011/0252206 A1 * | 10/2011 | Pyeon | 711/157 |

* cited by examiner

*Primary Examiner* — Ryan Bertram
(74) *Attorney, Agent, or Firm* — Dan Choi; Carole Boelitz; Micky Minhas (57) ABSTRACT

Techniques are described for controlling availability of memory. As memory write operations are processed, the contents of memory targeted by the write operations are read and compared to the data to be written. The availability of the memory for subsequent write operations is controlled based on the outcomes of the comparing. How many concurrent write operations are being executed may vary according to the comparing. In one implementation, a pool of tokens is maintained based on the comparing. The tokens represent units of power. When write operations require more power, for example when they will alter the values of more cells in PCM memory, they draw (and eventually return) more tokens. The token pool can act as a memory-availability mechanism in that tokens must be obtained for a write operation to be executed. When and how many tokens are reserved or recycled can vary according to implementation.

11 Claims, 7 Drawing Sheets

RELATED ART

MEMORY POWER TOKENS

RELATED APPLICATIONS

This application is a Continuation of application Ser. No. 12/970,890 filed Dec. 16, 2010 which is incorporated herein by reference in its originally filed form.

BACKGROUND

Phase-change material (PCM) memory, now commercially available, has been in use for non-volatile storage of digital data. Details and principles of operation of PCM memory are available elsewhere. While PCM memory has advantages and disadvantages relative to other forms of volatile as well as non-volatile memory, PCM writes are performed slowly relative to PCM reads, and PCM writes may be slow compared to writes of some other types of memory. Moreover, PCM writes require significant power because of the need to sufficiently heat a cell to change states. The power potentially needed for writing may also limit the write performance because as more writes are performed concurrently, more power is required; concurrency is limited by maximum power requirements. In addition, read performance can be impacted by write performance, because the longer that writes take to complete, the longer that pending reads must wait before being executed.

Various approaches have been taken to improve PCM memory. Because PCM memory has a limited lifetime write endurance, PCM memories have been designed such that when a write is to be performed, only the cells that would be changed by the write are physically modified. Additionally, caching techniques have been proposed to reduce the number of times that a cell is modified (set or reset). Nonetheless, improvements continue to be sought.

Techniques to improve PCM memory efficiency are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described for controlling availability of memory. As memory write operations are processed, the contents of memory targeted by the write operations are read and compared to the data to be written. The availability of the memory for subsequent write operations is controlled based on the outcomes of the comparing. How many concurrent write operations are being executed may vary according to the comparing. In one implementation, a pool of tokens is maintained based on the comparing. The tokens represent units of power. When write operations require more power, for example when they will alter the values of more cells in PCM memory, they draw (and eventually return) more tokens. The token pool can act as the memory-availability mechanism in that tokens must be obtained for a write operation to be executed. When and how many tokens are reserved or recycled can vary according to implementation.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to efficiency for PCM memory. Techniques to be described may reduce the amount of power required by PCM memory and may improve the overall read and write throughput speed of PCM memory. Explanation of these techniques will begin with discussion of how PCM writes have been previously handled, including mention of observations about inefficiencies in the prior way of handling writes. A general design for controlling or scheduling writes in a way that may allow higher concurrency and/or lower power consumption is discussed, followed by detailed explanation of variations and embodiments.

Figure 1:
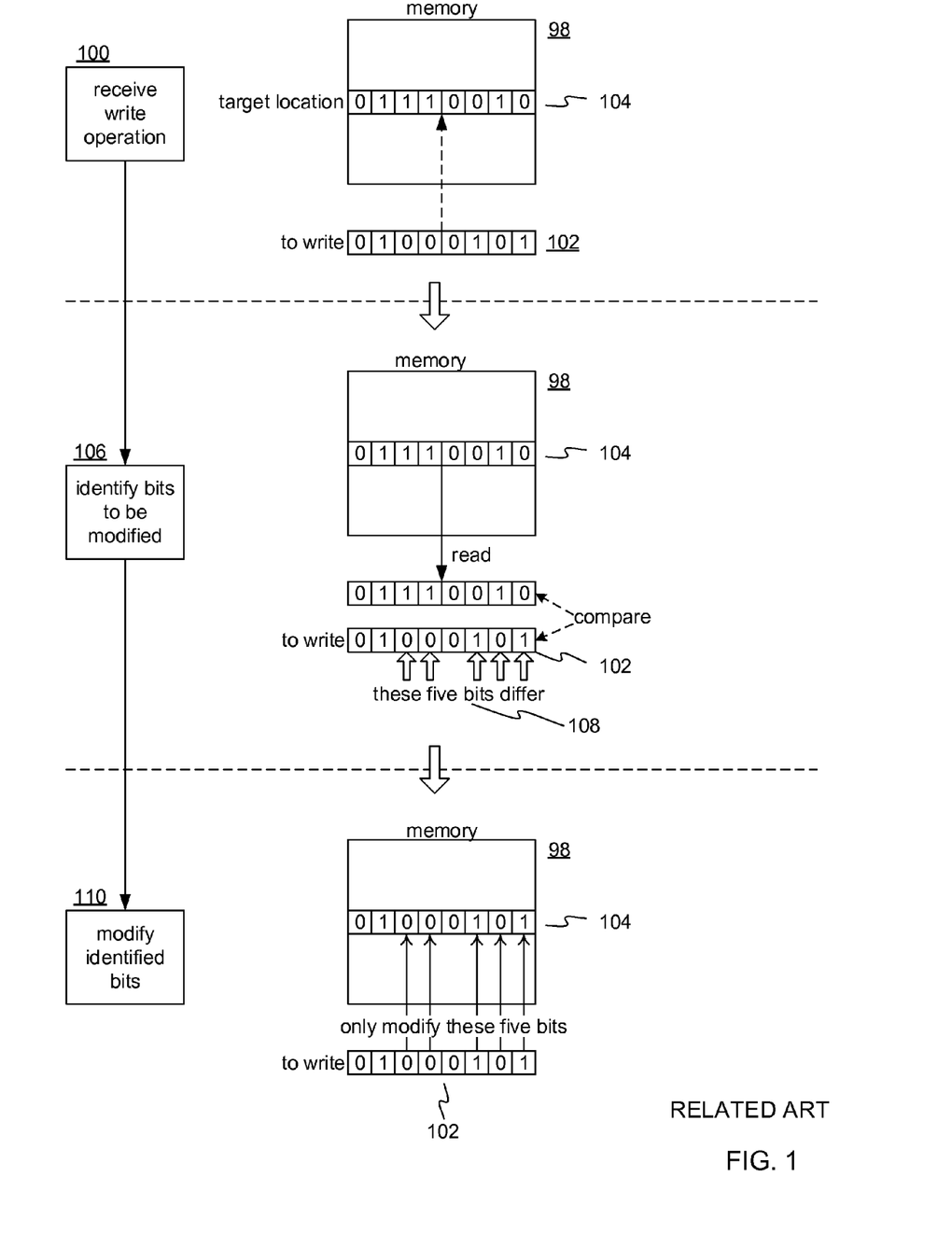
FIG. 1 shows a previous method of performing writes for PCM memory.

FIG. 1 shows a previous method of performing writes for PCM memory 98. At step 100 a write operation is received, for example by a memory controller. The write operation may include write data 102 (e.g., a row or page of data) and a target memory location 104 or address. Because of the cell-lifetime problem, to avoid unneeded writes to PCM cells, at step 106 bits to be changed 108 (physically modified or altered, i.e., bits that will be flipped) are identified. This is accomplished by reading the current content of the target memory location 104 and performing a bitwise comparison with the bits of the write data 102. At step 110, only the cells storing the bits to be changed 108 are written with the corresponding bits of the write data 102. Typically, writes that do not change any target cells have low latency.

It has not previously been appreciated that PCM memory chips have been designed for worst-case individual write operations, where the number of concurrent write operations is limited to a predefined power budget. That is, PCM memory chips are designed to have sufficient power available to modify all of the cells or bits targeted by all pending write operations, typically a row buffer or page. However, during typical operation, most writes to memory do not modify every cell in the target memory location. Assuming a random uniform distribution of data being written, on average, only half of the cells of a write might be modified. During many or even most of its write operations, a PCM memory chip will be configured to supply more power than is needed. Moreover, the number of concurrent writes may be limited because each concurrent write is assumed to need power sufficient to modify each cell in the target memory area.

Figure 2:
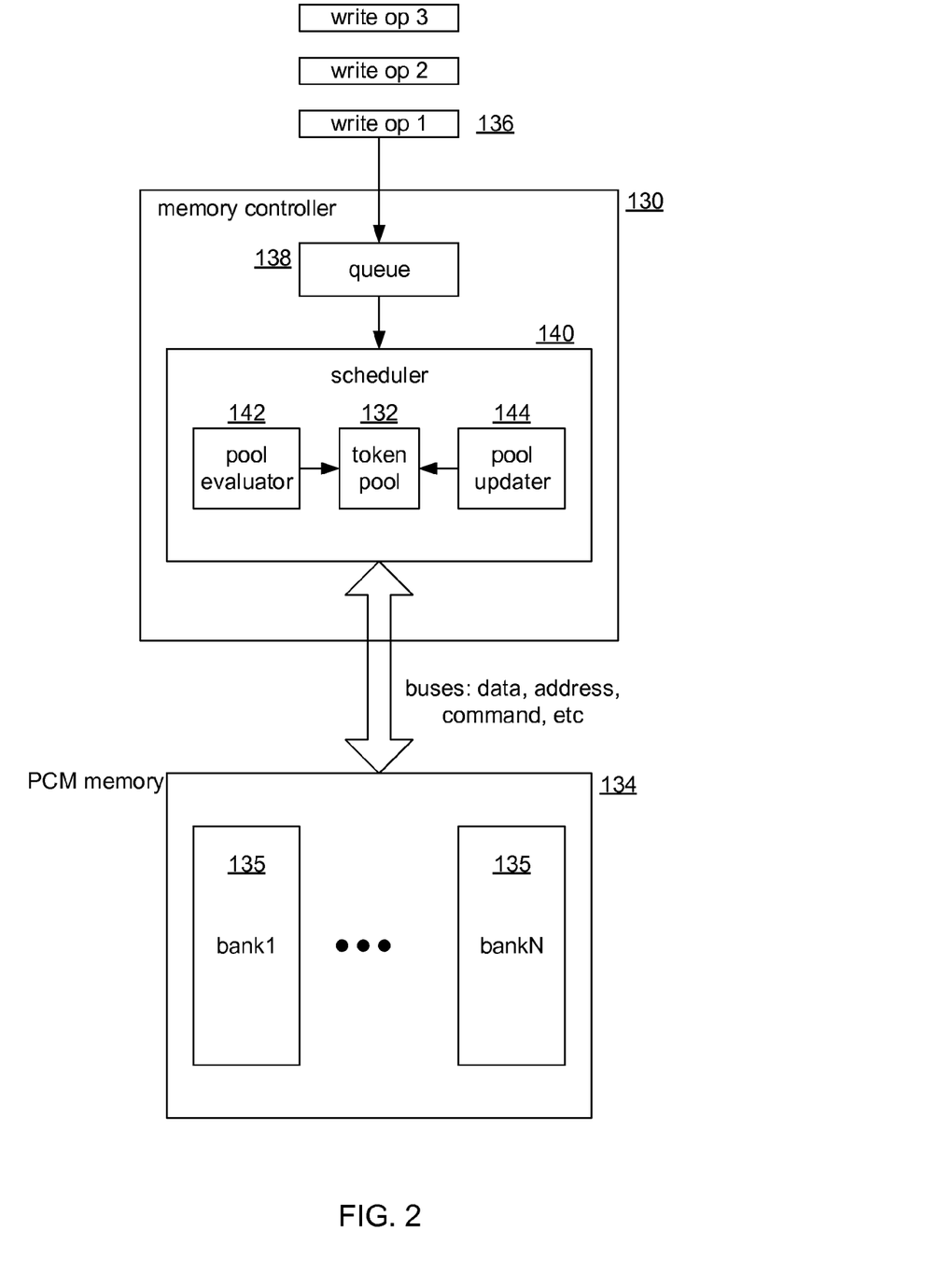
FIG. 2 shows a memory controller with a token pool.

FIG. 2 shows a memory controller 130 with a token pool 132. The memory controller controls access to a PCM memory 134, which may have one or more banks 135 or other units of storage. As operations, including write operations 136 are received, for example from a processor via a memory bus, they are stored in a queue 138, buffer, or the like. A scheduler 140 controls when write operations 136 are passed from the queue 138 to be executed by the PCM memory 134.

As will be explained below, the token pool 132 maintains information about how many cells are being modified by write operations as they are passed to the PCM memory 134. For discussion, the information will be described as tokens, although this is merely a convenient way of modeling how the memory controller 130 uses information about the actual cells to be updated by write operations to allow write operations to be performed with greater speed and/or concurrency.

A pool evaluator 142 evaluates the token pool 132 to determine whether to allow a write operation 136 in the queue 138 to issue to the PCM memory 134. For example, the pool evaluator may determine if there are sufficient tokens in the token pool 132 to allow the next pending write operation 136 to execute. A pool updater 144 updates the token pool 132 according to the flow and completion of write operations 136; as write operations are passed to the PCM memory 134, tokens are subtracted, and as write operations execute and/or complete, the pool updater 144 adds tokens back in to the token pool 132.

For understanding, a tokens (or token count) can be thought of as representing a quantum of power. Modification of a bit in PCM memory requires a certain amount of power, and this quantum of power is represented by a token. A write operation only needs to acquire as many tokens as are needed in proportion to the number of cells to be modified and the amount of power required by the write operation. While a write operation will be spoken of as having acquired and recycled tokens, no actual tokens need to shuttle around. In practice, a count of tokens may be maintained that fluctuates with the needs of the write operations. Integers (tokens) are added to and subtracted from the count. Nonetheless, using the token model, the total number of tokens available in the system is fixed so that the total system power consumption never exceeds a predetermined limit. Write operations are guaranteed to only proceed when enough power is available by forcing each write to wait until it has collected enough tokens. Note that the maximum number of the available tokens (e.g., when no writes are being processed) may be chosen such that at most N concurrent write operations can be executed that each update all of their corresponding PCM memory cells. In other words, tokens are provided based on maximum possible power requirement, and as less power (conversely, fewer tokens) is needed for operations, tokens are available for other write operations.

Figure 3:
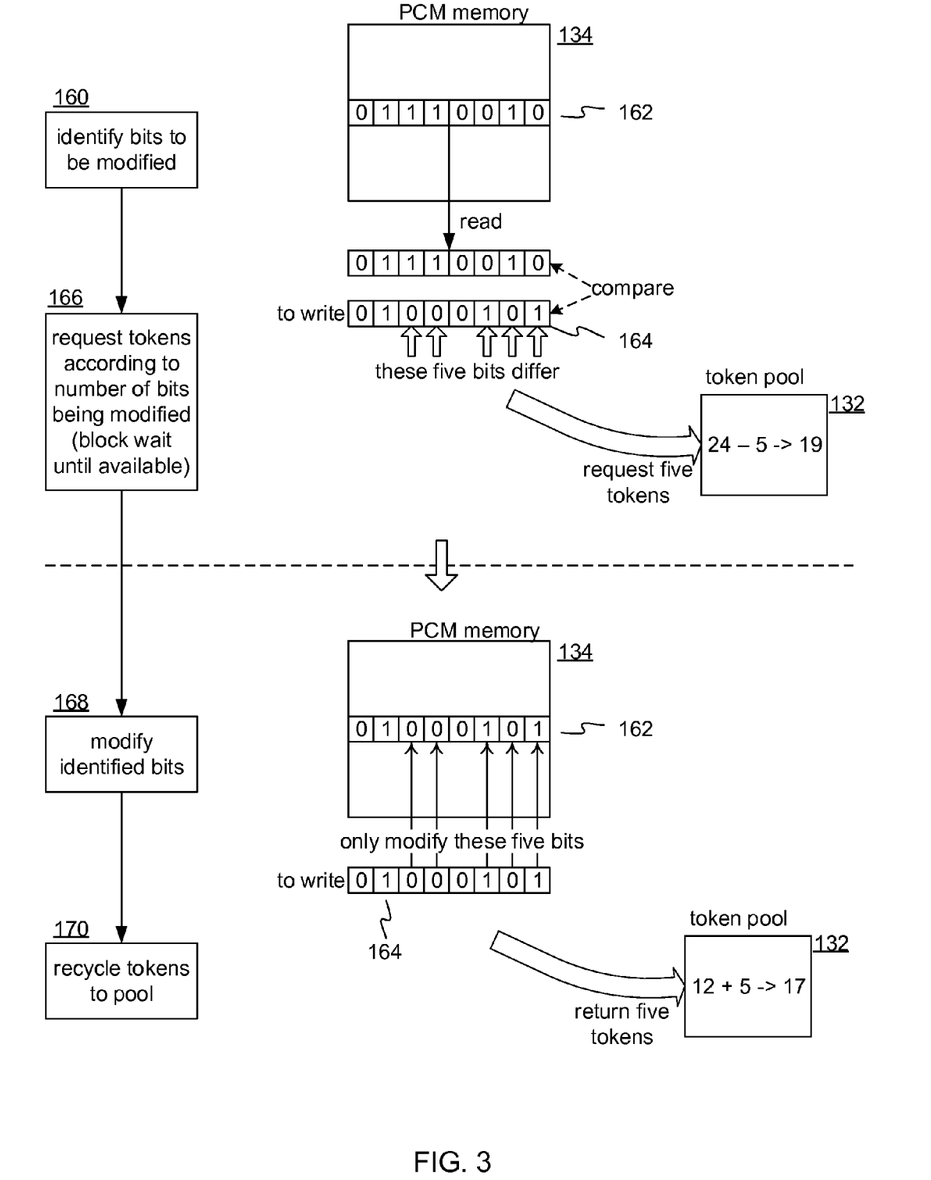
FIG. 3 shows a process of using token pool to regulate the scheduling or execution of write operations.

FIG. 3 shows a process of using token pool 132 to regulate the scheduling or execution of write operations. At a step 160, assuming that a write operation has been received by the memory controller 130, the bits or cells to be modified are identified. Note that only the count of such cells may be as useful as the actual identity of the cells. The contents of the write operation's target memory location 162 is read from the PCM memory 134 and compared to the write data 164 to be written by the write operation. In the example of FIG. 3, five bits are determined to differ (a "bit distance" of five). That is, five cells will be "flipped" (will have power applied thereto).

At step 166, if sufficient tokens are available (for example, five), the write operation proceeds. As the write operation is issued to the PCM memory, a number of tokens is reserved or requested that is proportional to the number of cells identified at step 160. In the example of FIG. 3, five tokens are reserved, and the token pool 132 is reduced by five. At step 168, the write operation is performed and the identified bits or cells are modified in the PCM memory 134. Finally, at step 170, the reserved tokens are recycled to the token pool 132. In the example of FIG. 3, the token pool 132 is increased by five.

While variations will be described below, several features should be noted. With one approach, the PCM memory 134 signals the memory controller to recycle the tokens, for example when the write operation is executing or completing. In another approach, the memory controller itself tracks outstanding tokens and recycles them at a time when the issued write operation is assumed to complete (e.g., a fixed period of time) or at a computed completion time (e.g., the memory controller may have a table or function that computes how long write operations take). Again, regarding the notion of tokens, what is notable is not the use of tokens per se, but rather the tracking and use of information about how many cells are to be modified (and the power required to do so) in order to control the timing and/or concurrency of write operations. As the number of cells that could be updated at any moment varies, for example, as different writes are concurrently executing, the ability to issue additional writes will also vary. If the executing writes have caused many tokens to be reserved, issuance of other queued writes will slow or pause until sufficient tokens are returned as the current write operations complete. If executing writes together are modifying few cells, then other writes will be able to issue quickly because there will be available tokens. Moreover, the size of the token pool is selected in advance so that the maximum available power cannot be exceeded, regardless of how many cells a write will update.

Figure 4:
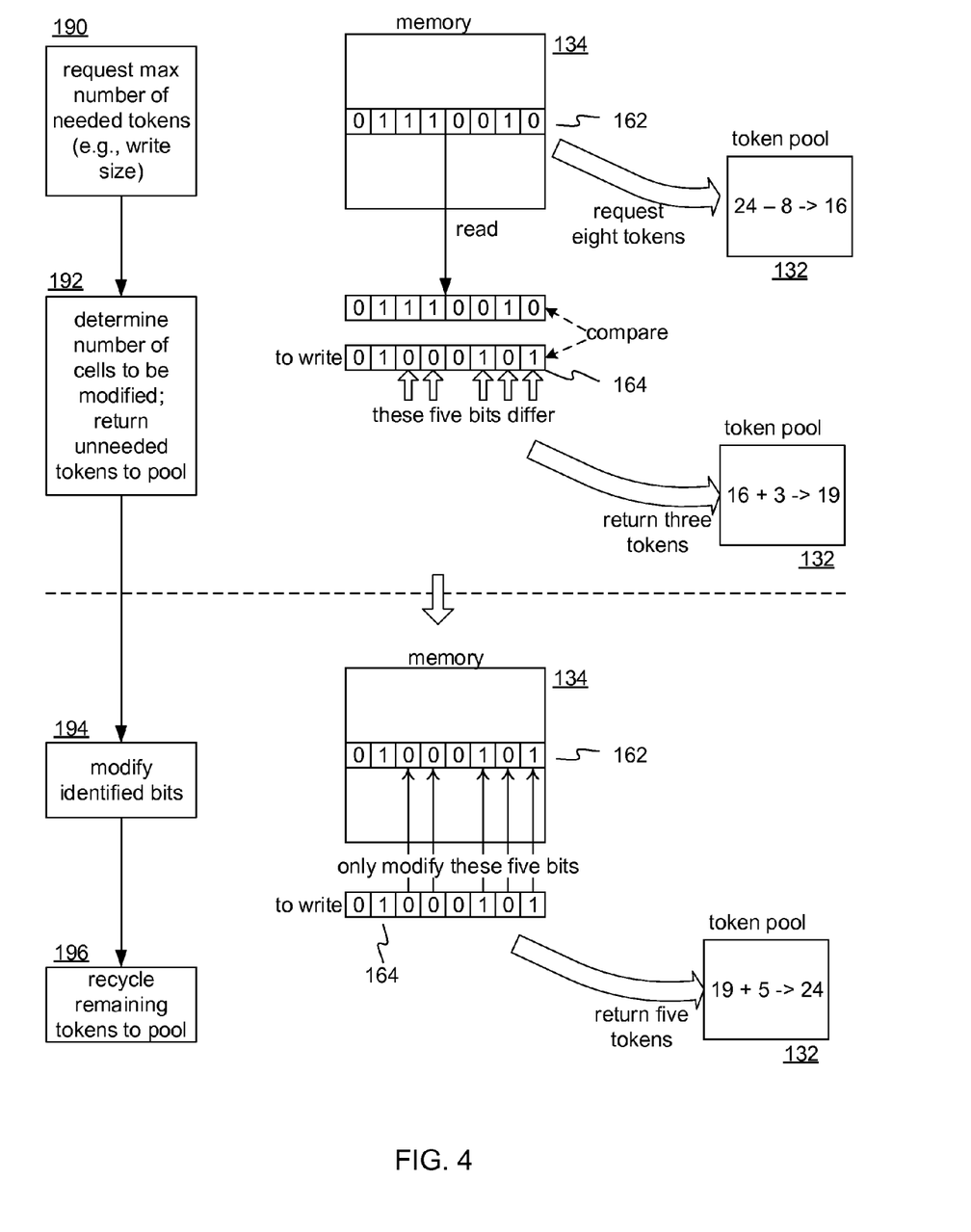
FIG. 4 shows an embodiment where a maximum possible number of tokens for a write operation is initially reserved, and then recycled by stages.

FIG. 4 shows an embodiment where a maximum possible number of tokens for a write operation is initially reserved, and then recycled by stages. In this embodiment, after a write request is received, at step 190 the memory controller requests a maximum allocation of needed tokens. If the maximum allocation of tokens is not available, the write operation is delayed until the necessary tokens become available. The maximum allocation of tokens might be based, for example, on the size of the write data 164 to be written (regardless of the content of the target memory location 162). The maximum number of tokens in general is related to the maximum power needed to perform a write operation that would alter each target cell with a new bit value. If a write operation is for 512 bits, 512 tokens may be reserved (allocation of tokens-to-cells need not be on a 1-to-1 ratio, as seen further below). In the example of FIG. 4, a single byte is to be written, so eight tokens are withdrawn from the token pool 132.

At this stage, the current write operation is guaranteed to be able to proceed to completion. However, as the write operation proceeds, at step 192, the number of cells to be updated is determined and unneeded tokens are immediately returned to the token pool, possibly before the actual cell updating begins. In the example of FIG. 4, as five cells will be modified by the write operation, three cells will not be modified. Thus, in the example, three tokens are returned to the token pool 132 and are immediately available for other write operations. Note that the current write operation has not yet been performed and yet the token pool 132 has been updated to accommodate other write operations.

At step 194, the write operation is performed and the target cells are modified with the identified bits that differ from the current bits in memory location 162. At this time, at step 196, the remaining tokens associated with the current write are returned to the token pool 132. In the example, five tokens are returned. Note that depending on the particular circuit involved, the tokens might be returned at various times in close proximity to the actual writing. For example, the time needed to increase the token pool 132, communication time, and other latencies, may be taken into account so that the returning tokens become available in the token pool 132 close in time to when the write operation physically completes and no longer draws state-changing power.

In a variation of this reserve-compare-return-write-return embodiment, tokens may actually be returned in phases. As the write operation is being performed, the tokens are returned in increments. For example, half of the reserved tokens (after step 192) may be returned halfway through the writing, and the other half may be returned when the writing completes. Depending on the architecture of the PCM memory 134, it might be possible to return tokens at a finer granularity, or at rates that vary over the duration of the physical writing. In one embodiment, the PCM memory 134 executes writes by first writing 0's and then writing 1's, in which case the tokens may be returned at a varying rate, for example, at a higher rate when 0's are being written, and at a lower rate when 1's are being written. Note that groups of bits may also start and end being written at different times, thus allowing tokens to be requested and returned at different times.

In another variation, a default number of tokens is reserved for a write, where the default can be lower than the number required by a write. The write is analyzed, for example by comparing new and old content, and the memory module then requests more tokens from the pool evaluator/updater when the need for additional tokens is discovered. This is yet another way of regulating the availability of memory for concurrent operations based on the power needs of memory operations; as more power is required, the memory becomes less available, and as less power is required, the memory becomes more available.

Figure 5:
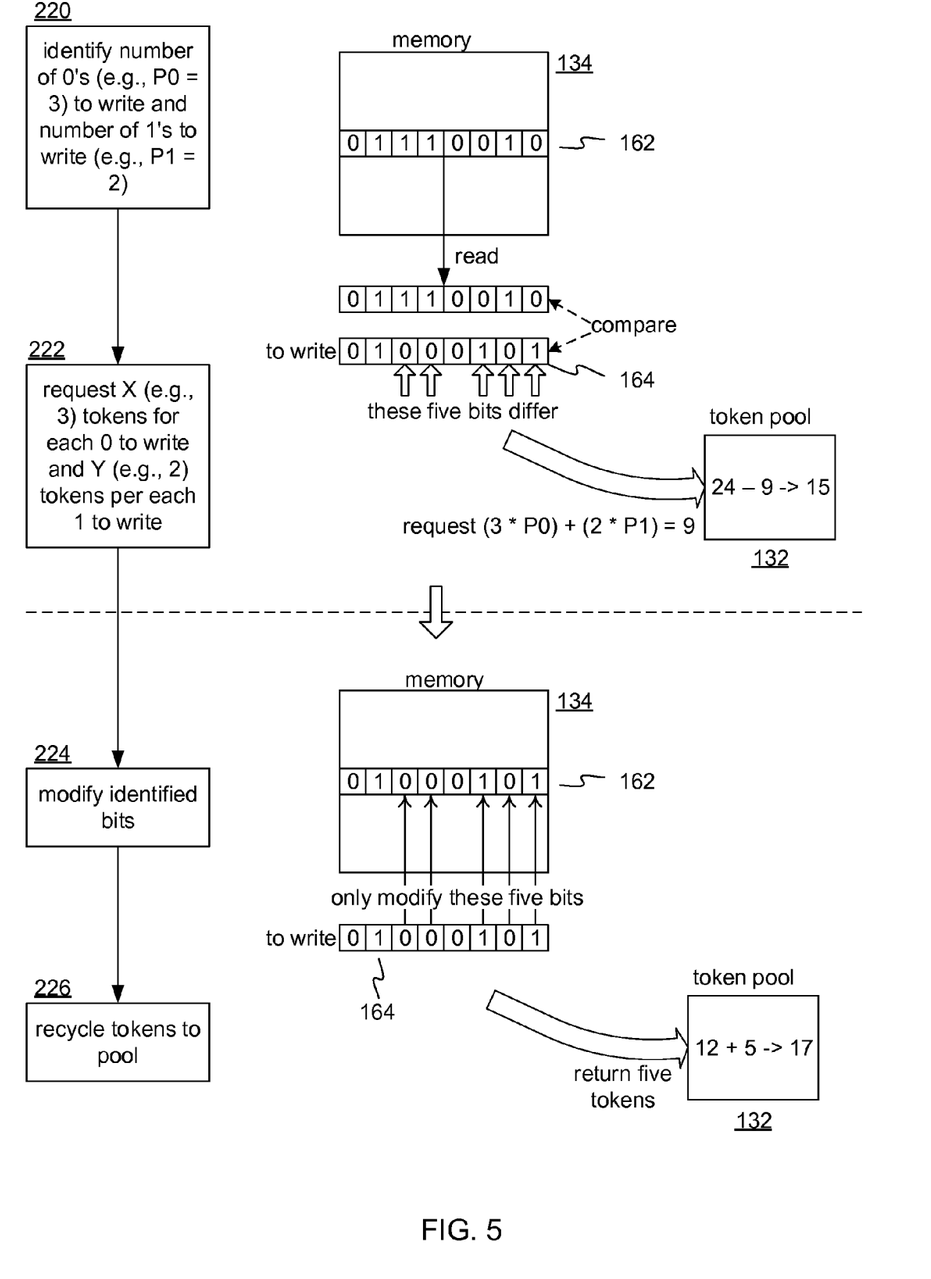
FIG. 5 shows an embodiment where tokens are allocated in proportion to the number of 0's and the number of 1's to be written.

FIG. 5 shows an embodiment where tokens are allocated in proportion to the number of 0's and the number of 1's to be written. Assuming that a write operation is being considered for scheduling, and assuming that a sufficient number of tokens are currently available in the token pool 132, scheduling of a write operation begins at step 220 by identifying the number of 0's to be actually written and the number of 1's to be actually written. In the example shown in FIG. 5, P0 (the number of 0's) is three, and P1 (the number of 1's) is two. The reason for counting 0's and 1's separately is to allocate tokens in respective different proportions. Because so-called "resets" (0-writes) in PCM memory require higher temperature and therefore power to effect the needed phase change, tokens can be allocated in greater proportion for 0's relative to 1's. In the example of FIG. 5, the ratio is 3-to-2; 3 tokens per 0 are reserved, and 2 tokens per 1 are reserved. Thus, at step 222, with three 0's to write, and two 1's to write, nine total tokens are requested. Expressed as a formula, the tokens to be reserved are equal to $(X*P0+Y*P1)$, where X is the number of tokens per 0, and Y is the number of tokens per 1. Different ratios will likely be used for different chip designs.

At step 224 the write operation is performed by writing the new bits from write data 164 to the target memory location 164. At step 226, the tokens associated with the write operation are added back to the token pool 132. Note that this embodiment can be mixed with approaches discussed above. For example, an initial maximum allocation may be reserved, for example, assuming that the write operation will overwrite the entire target memory with all 0's. In the example of FIG. 4, 24 tokens would be allocated (3*8). Tokens are then returned during the write by increments as discussed above (possibly returning 0-related tokens first). Moreover, tokens can be returned at different rates according to whether 0's or 1's are being written.

Figure 6:
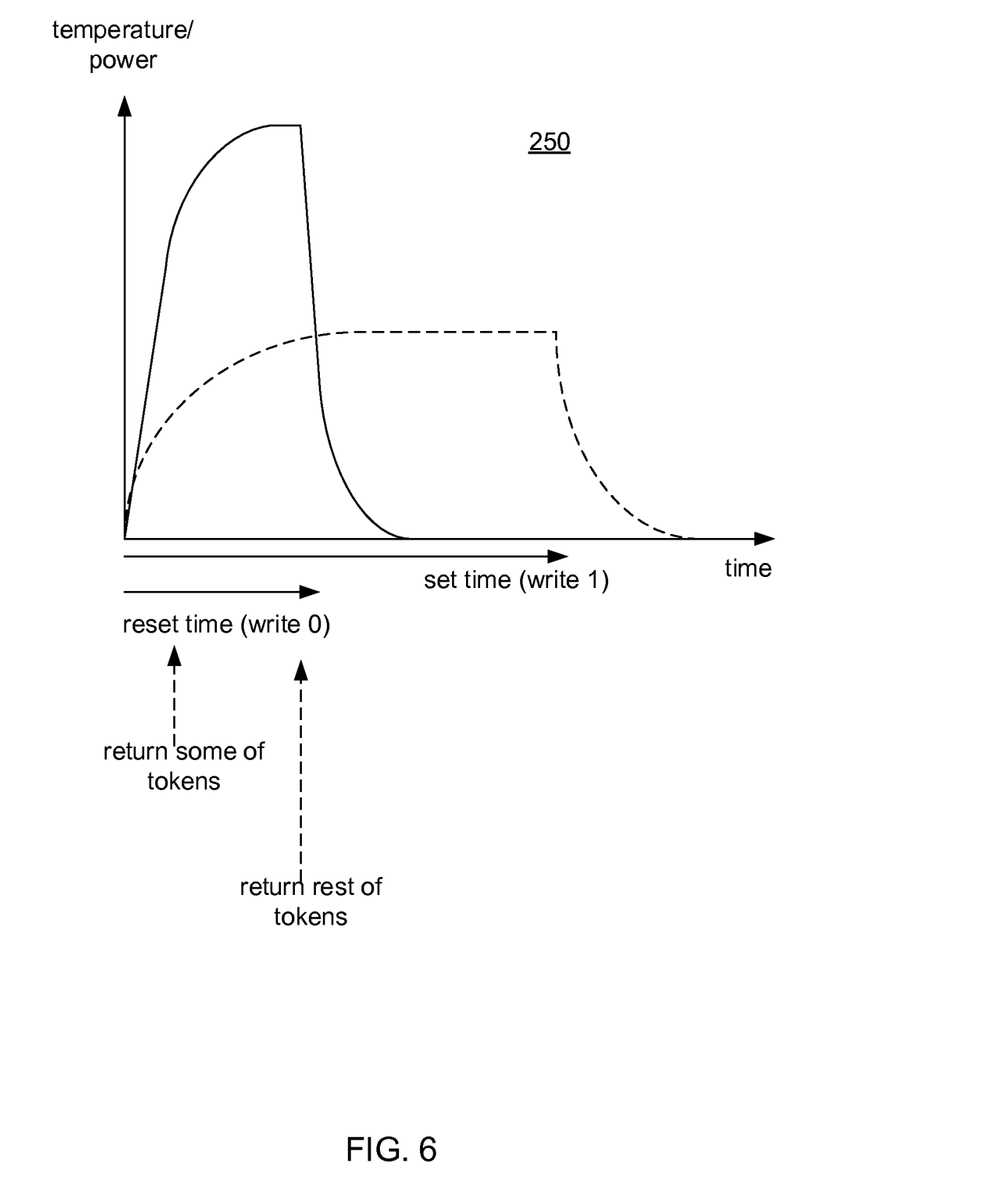
FIG. 6 shows power curves in relation to token recycling.

FIG. 6 shows power curves in relation to token recycling. With PCM memory, as seen in graph 250, "resets" (writes of 0 bits) occur quickly but with higher peak power, and "sets" take longer but require less peak power. These power curves can be used to inform the allocation and recycling of tokens. As discussed above, referring to "reset" curve 252, tokens may be returned to the token pool at different times during a "reset" write operation.

Figure 7:
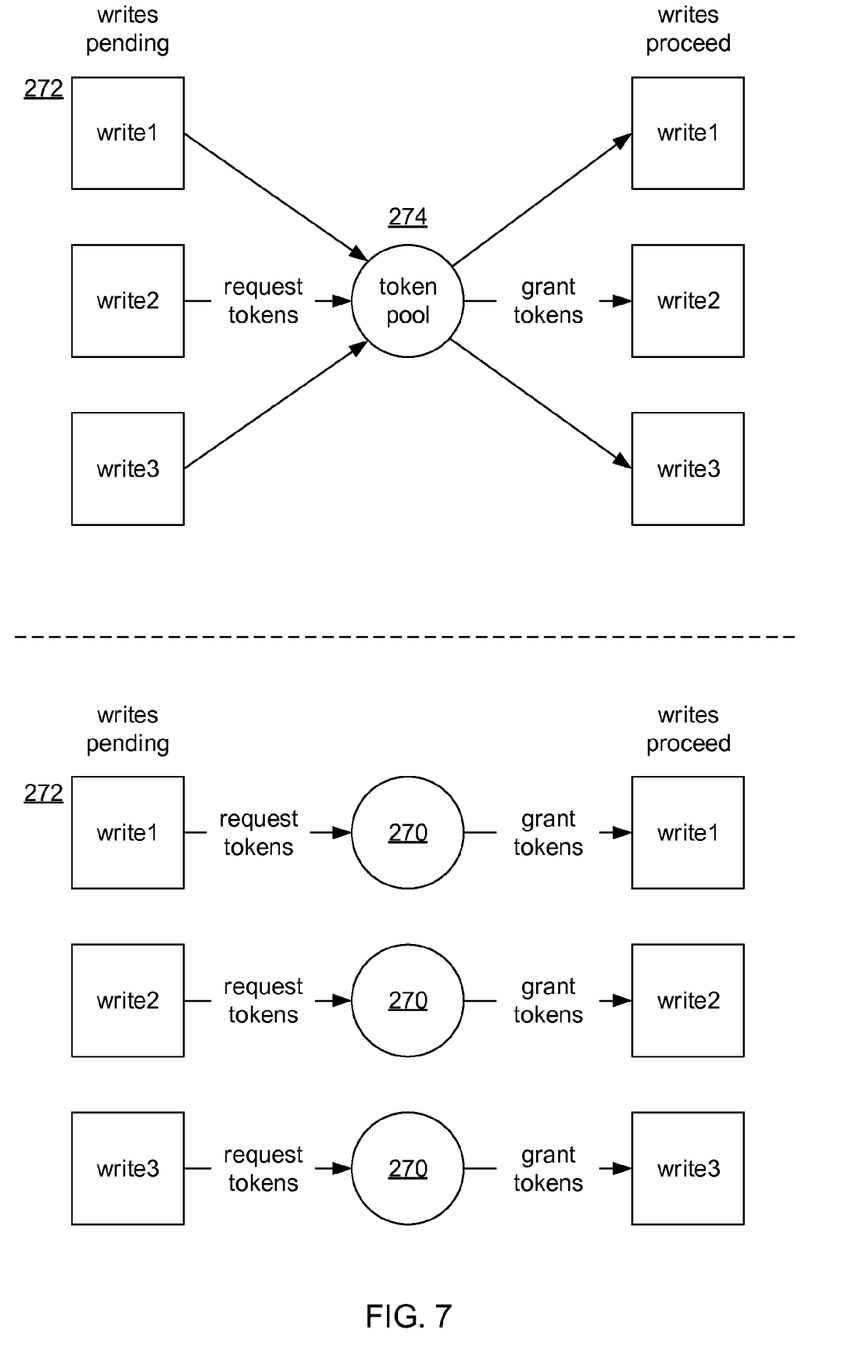
FIG. 7 shows distributed independent token pools.

FIG. 7 shows distributed independent token pools 270. In the upper diagram, pending write operations 272 draw from the same token pool 274. As tokens are granted from the token pool 274, writes proceed. In the lower diagram, pending write operations 272 draw from independent token pools 270. This approach may be used to regulate tokens separately for different corresponding banks of PCM memory, different chips, or other units of memory that may be able to operate concurrently and have separate power circuits. In one embodiment, when there are multiple levels of power restrictions, a hierarchy of power token pools is used.

While embodiments above relate to writes to a PCM memory, the same techniques can also be applied to read operations, though perhaps with less gain due to the lesser power requirements of read operations. Moreover, while the techniques discussed above are helpful for PCM memories which can be designed to write only to cells that have a bit value different from an incoming bit value, the same techniques can be used with other forms of memory, such as silicon-based dynamic memory, or any type of memory that uses power to perform read and write operations where the power required for these operations varies over time.

As noted above, the use of tokens is merely one way of modeling information about how power will be consumed by read or write operations in memory. Any type of information that reflects information about the amounts of memory to be actually modified (or actually read, in the case of read operations) and the amount of power required for those operations to complete can be employed. In general, any technique of controlling availability of memory or power by comparing data to be written with targeted memory may be used. For example, any technique that estimates power consumption of a memory operation may be used, with the idea that availability of memory for additional operations is scaled according to the power necessary for outstanding operations.

Conclusion

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:
1. A method of controlling write operations in a phase change material (PCM) memory, the method comprising:
for a first write operation directed to a part of the PCM memory, determining difference information corresponding to a number of bit differences between data requested to be stored by the first write operation and data in the part of the PCM memory; and controlling timing of performing a second write operation based on the determined difference information corresponding to the number of bit differences between the data in the part of the PCM memory and the data requested to be stored by the first write operation.

2. A method according to claim 1, wherein the controlling is performed by maintaining write information that reflects an amount of the PCM memory determined to be subject to physical modification by write operations.

3. A method according to claim 2, wherein the write information comprises a fluctuating number, and the controlling comprises checking the current value of the fluctuating number to determine whether or when to allow execution of the second write operation.

4. A method according to claim 3, wherein the fluctuating number is increased or decreased according to the difference information.

5. A method according to claim 3, further comprising adding to or subtracting from the fluctuating number an amount corresponding or proportional to the number of bit differences.

6. A method according to claim 1, wherein the difference information is determined by obtaining a count of cells having values determined to differ from values to be written by the first write operation.

7. A storage device comprising:
a memory storing stored data;
a logic component that when executing receives incoming write operations to write data to the storage device, temporarily stores the write operations before implementation thereof, and controls timing of implementation of the write operations according to determinations of individual amounts of bits to be physically updated by the respective write operations.

8. A storage device according to claim 7, wherein as more data is determined to be physically updated by the write operations delay of the write operations is increased.

9. A storage device according to claim 8, wherein as less data is determined to be physically updated by the write operations delay of the write operations is increased.

10. A storage device according to claim 7, wherein a write operation comprises a word to be written, and wherein a determination of an individual amount of bits to be physically updated by the write operation is made by comparing bits of the word with bits of a corresponding part of the PCM memory that corresponds to the write operation.

11. An apparatus to control write operations for a phase change material (PCM) memory, the apparatus comprising:
a bit comparing circuit that, when the apparatus is in operation, for a first write operation directed to a part of the PCM memory, determines difference information corresponding to a number of bit differences between data requested to be stored by the first write operation and data in the part of the PCM memory; and
a controlling circuit that, when the apparatus is in operation, controls timing of performing a second write operation based on the determined difference information corresponding to the number of bit differences between the data in the part of the PCM memory and the data requested to be stored by the first write operation.

* * * * *